Patented July 11, 1939

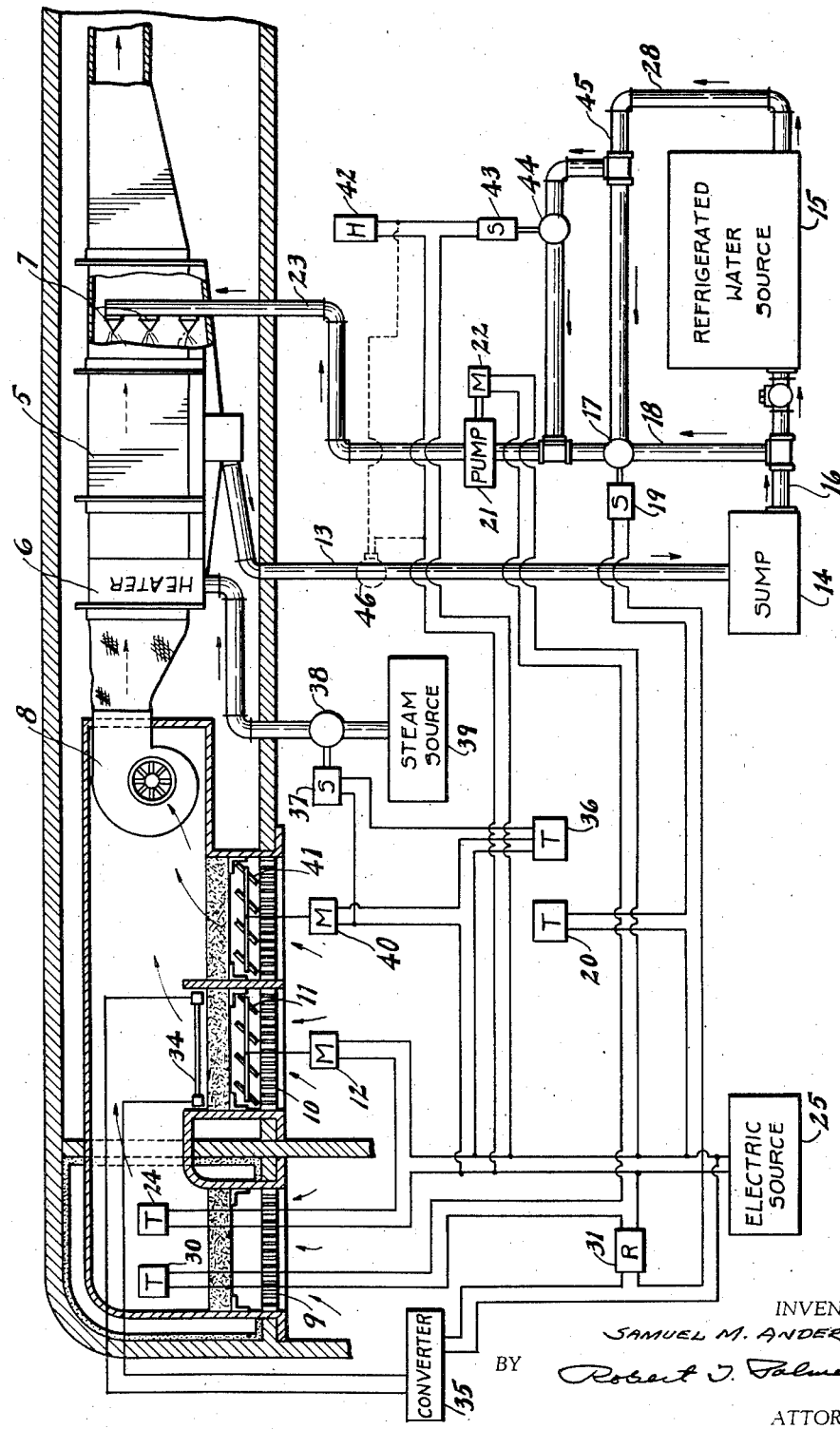

2,165,830

UNITED STATES PATENT OFFICE 2,165,830

AIR CONDITIONING SYSTEM FOR PASSENGER VEHICLES

Samuel M. Anderson, Sharon, Mass., assignor to B. F. Sturtevant Company, Hyde Park, Boston, Mass.

Application December 23, 1937, Serial No. 181,365

8 Claims. (Cl. 236—44)

This invention relates to systems for the conditioning of air and relates more particularly to air washer systems for passenger vehicles.

Air conditioning systems utilizing air washers are preferable, it is believed, for passenger vehicles such, for example, as railway passenger cars. The air is cleaned and odors and harmful bacteria are removed. During a large portion of the time evaporative cooling may be employed with resulting saving in refrigeration.

A feature of this invention resides in providing an air washer system in which a wet bulb thermostat adjusts the air control dampers for 100% outdoor air when the wet bulb temperature of the outdoor air is low enough for evaporative cooling to be effective while an indoor thermostat opens and closes a by-pass around a source of refrigerated water. The sprays operate continuously during the cooling and mild weather seasons and evaporative cooling is utilized when effective, while refrigerative cooling is utilized when evaporative cooling is ineffective.

Another feature of this invention resides in the provision of thermostatic control for discontinuing the sprays when the temperature of the outdoor air reaches a predetermined minimum.

Still another feature of this invention resides in providing an ultra-violet sterilizer for irradiating the air when the sprays are discontinued.

An object of the invention is to provide an all year air cleaning and temperature conditioning system.

Another object of the invention is to cool the air of a passenger vehicle by evaporative cooling supplemented by refrigerative cooling.

Other objects of the invention will be apparent from the following description taken together with the drawing.

The invention will now be described with reference to the drawing which illustrates diagrammatically, one embodiment of this invention as applied to a railway passenger car.

The air washer 5 contains the air heater 6 and spray nozzles 7. The fan 8 draws in outdoor air through the vestibule grille 9 and recirculated air through the grille 10 and forces this air through the washer 5 and thence through any suitable duct, into the passenger space.

The washer 5 drains through the pipe 13 into the sump 14. The sump is connected to the refrigerated water source 15 by the pipe 16. Water from the source 15 passes to the valve 17 through the pipe 28. The pipe 18 forms a by-pass around the source 16, and the valve 17 opens and closes this by-pass under control of the solenoid 19 which in turn is controlled by the thermostat 20. The pump 21 driven by the motor 22 forces the water through the pipe 23 to the nozzles 7 in the washer 5.

The ultra-violet lamps 34 are mounted in the recirculated air passage and are controlled by the thermostat 30 which alternatively initiates the sprays in the washer 5 and the lamps 34. When the outdoor air is cold, the sprays are shut down and the lamps turned on. In warm and mild weather, the sprays are operated and the lamps are deenergized.

When the wet bulb temperature of the outdoor air is below 64° F., for example, the thermostat 24 closes a circuit including the damper control motor 12 and the electric source 25 causing the motor 12 to close the dampers 10 to discontinue the supply of recirculated air to the fan 8.

When the wet bulb temperature of the outdoor air is above 64° F., the thermostat 24 opens its contacts and the damper motor 12 is deenergized and adjusts its dampers 11 to 75% recirculated air.

The indoor thermostat 20 acts at and above 75° F., for example, to close the circuit including the solenoid 19 and electric source 25 causing the solenoid to become energized to adjust the valve 17 to close off the flow through the by-pass pipe 17 and to open up the flow through the pipe 28. This enables the pump 21 to draw refrigerated water from the source 15.

When the thermostat 20 is satisfied, its contacts open and the solenoid is deenergized and adjusts the valve 17 to open the by-pass pipe 18 and close the pipe 28.

The thermostat 30 which may be a dry bulb thermostat exposed to the outdoor air entering the system, functions at 55° F., for example, to open the energizing circuits of the relay 31 and of the pump motor 22. This causes the pump 21 to shut down and the supply of the water to the washer 5 to cease. The relay 31 becomes deenergized and closes its contacts to connect the converter 35 supplying electric energy to the lamps 34, to the electric source 25.

The sprays are operated during warm and mild weather and act effectively to wash all foreign matter including bacteria from the air. It is not feasible to operate the sprays during cold weather for the reason that condensation forms upon the window panes, obscuring vision. The ultra-violet lamps then come into action to continue the sterilization of the air. The sprays are on when the lamps are off and vice versa.

The indoor thermostat 36 is connected in circuit with the solenoid 37, the damper motor 40, and the electric source 25, and controls the addition of heat when the air in the car is too cold. The thermostat 36 operates at a lower temperature than the thermostat 20 does, to control the temperature when with the system in evaporative cooling, the air is still too cold. The thermostat 20 may function at 75° to operate the by-pass valve 17 for recirculation of the spray water. If the outdoor thermostat 24 has closed the recirculated air dampers and the outdoor wet bulb temperature is relatively low, the air supplied by the washer 5 may be too cold. To compensate for this, the thermostat 36 operates first at 72° F., for example, to close the energizing circuit from the electric source 25 to the damper motor 40 which then adjusts the dampers 41 to admit recirculated air into the blowers 3. This mixture of recirculated air with the outdoor air reduces the evaporative cooling effect through adding air of relatively high wet bulb temperature to the outdoor air having a relatively low wet bulb temperature. If this adjustment is insufficient and the temperature of the air falls to 70° F., for example, the thermostat 36 operates at 70° F. to connect the solenoid 37 to the electric source 25 causing this solenoid to become energized to open the valve 38 in the steam line from the steam source 39 to the heater 6.

Under some conditions, it is possible that the relative humidity of the indoor air may rise when the spray water is recirculated with the by-pass around the refrigeration source 15, open. To take care of this, the hygrostat 42 may be provided for energizing the solenoid 43 from the electric source 25 causing it to open the valve 44 in the water pipe 45 connecting the pipe 28 from the refrigeration source 15, to the suction of the pump 21. This causes the mixture of refrigerated water with the recirculated water and the lowering of the temperature of the spray water resulting in the lowering of the humidity of the indoor air. The thermostat 46 exposed to water returned from the washer could accomplish the same result by maintaining a minimum water temperature.

An advantage of having an indoor thermostat operate the by-pass around the refrigeration source in an evaporative cooling system is that the system starts off in the refrigerative cooling cycle when the car is first placed in service or where due to some other condition, straight evaporative cooling is not sufficient, even though it would be sufficient after the system has been in operation for a period of time.

Another advantage over prior evaporative cooling systems is that the sprays are operated continuously during the cooling and mild weather systems.

While the thermostat 20 has been referred to as opening and closing the by-pass around the refrigerated water source 15, these terms also include the partial opening and partial closing respectively, of the by-pass.

While one embodiment of the invention has been described for the purpose of illustration, it should be understood that the invention is not limited to the exact apparatus and arrangement of apparatus illustrated and described, since many departures may be suggested by those skilled in the art, without departing from the spirit of the invention.

What is claimed is:

1. Air conditioning apparatus comprising an air washer, means for supplying outdoor and recirculated air into said washer, a source of refrigerated water, a pump for supplying water from said source to said washer, means forming a by-pass around said source and connected to said pump whereby water may be recirculated through said washer without being cooled by said source, means responsive to changes in the wet bulb temperature of the outdoor air entering said washer for adjusting said first mentioned means for increasing the proportion of outdoor and for decreasing the proportion of recirculated air entering said washer, when the wet bulb temperature of the outdoor air is low enough for evaporative cooling to be effective, an indoor thermostat, and means controlled by said thermostat for adjusting said by-pass for opening said by-pass when the indoor temperature is at or below a desired standard and for closing said by-pass when the indoor temperature is above said standard.

2. Air conditioning apparatus comprising an air washer, means for supplying outdoor and recirculated air into said washer, a source of refrigerated water, a pump for supplying water from said source to said washer, means forming a by-pass around said source and connected to said pump whereby water may be recirculated through said washer without being cooled by said source, means responsive to changes in outdoor wet bulb temperatures, for adjusting said first mentioned means for increasing the proportion of outdoor and for decreasing the proportion of recirculated air entering said washer, when the wet bulb temperature of the outdoor air is low enough for evaporative cooling to be effective, an indoor thermostat, means controlled by said thermostat for adjusting said by-pass for opening said by-pass when the indoor temperature is at or below a desired standard and for closing said by-pass when the indoor temperature is above said standard, energizing means for said pump, and means including an outdoor thermostat for adjusting said energizing means for shutting down said pump when the temperature of the outdoor air reaches a predetermined minimum.

3. Air conditioning apparatus comprising an air washer, water supply means for spray water to said washer, means for supplying air into said washer, an ultra-violet lamp exposed to said air for irradiating same, electric energizing means for said lamp, and thermostatic means for discontinuing said water supply means and for connecting said lamp to said energizing means.

4. Air conditioning apparatus comprising an air washer, water supply means for spray water to said washer, means for supplying air into said washer, an ultra-violet lamp exposed to said air for irradiating same, electric energizing means for said lamp, and thermostatic means responsive to changes in the temperature of said air for discontinuing said water supply means and for connecting said lamp to said energizing means.

5. Air conditioning apparatus comprising an air washer, water supply means for spray water to said washer, means for supplying air into said washer, an ultra-violet lamp exposed to said air for irradiating same, electric energizing means for said lamp, and thermostatic means responsive to changes in the temperature of the outdoor air for discontinuing said water supply means and for connecting said lamp to said energizing means.

6. Air conditioning apparatus comprising an air washer, means for supplying outdoor and recirculated air into said washer, a source of refrigerated water, a pump for supplying water from said source to said washer, means forming a by-pass around said source and connected to said pump whereby water may be recirculated through said washer without being cooled by said source, means responsive to changes in the wet bulb temperature of the outdoor air for adjusting said first mentioned means for increasing the proportion of outdoor and for decreasing the proportion of recirculated air entering said washer, when the wet bulb temperature of the outdoor air is low enough for evaporative cooling to be effective, an indoor thermostat, means controlled by said thermostat for adjusting said by-pass for opening said by-pass when the indoor temperature is at or below a desired standard and for closing said by-pass when the indoor temperature is above said standard, energizing means for said pump, an ultra-violet lamp, energizing means for said lamp, and means including an outdoor thermostat for adjusting said energizing means for shutting down said pump and for turning on said lamp when the temperature of the outdoor air reaches a predetermined minimum.

7. Air conditioning apparatus comprising an air washer, a fan for supplying outdoor and recirculated air into said washer, means for varying the proportion of outdoor to recirculated air supplied by said fan to said washer, a source of refrigerated water, a pump for supplying water from said source to said washer, means forming a by-pass around said source and connected to said pump whereby water may be recirculated through said washer without being cooled by said source, means responsive to changes in the wet bulb temperature of the outdoor air for adjusting said first mentioned means for increasing the proportion of outdoor and for decreasing the proportion of recirculated air entering said washer, when the wet bulb temperature of the outdoor air is low enough for evaporative cooling to be effective, an indoor thermostat, means controlled by said thermostat for adjusting said by-pass for opening said by-pass when the indoor temperature is at or below a desired standard and for closing said by-pass when the indoor temperature is above said standard, a second indoor thermostat, and means controlled by said second thermostat for adjusting said first mentioned means for increasing the proportion of recirculated air entering said washer when the indoor temperature falls to a predetermined point.

8. Air conditioning apparatus comprising an air washer, means for supplying outdoor and recirculated air into said washer, a source of refrigerated water, a pump for supplying water from said source to said washer, means forming a by-pass around said source and connected to said pump whereby water may be recirculated through said washer without being cooled by said source, means responsive to changes in the outdoor wet bulb temperature for adjusting said first mentioned means for increasing the proportion of outdoor and for decreasing the proportion of recirculated air entering said washer, when the wet bulb temperature of the outdoor air is low enough for evaporative cooling to be effective, an indoor thermostat, means controlled by said thermostat for adjusting said by-pass for opening said by-pass when the indoor temperature is at or below a desired standard and for closing said by-pass when the indoor temperature is above said standard, means forming a connection from said source to said pump around said by-pass for admitting water from said source to said pump when said by-pass is open, and means including an indoor humidostat for adjusting said last mentioned means for supplying water from said source to said pump for preventing an undesired rise in the relative humidity of the indoor air.

SAMUEL M. ANDERSON.